(12) United States Patent
Gu et al.

(10) Patent No.: US 7,974,725 B2
(45) Date of Patent: Jul. 5, 2011

(54) INTEGRATED TESTING SYSTEM AND METHOD FOR VALIDATION OF A MANUFACTURING AUTOMATION SYSTEM

(75) Inventors: Fangming Gu, Rochester Hills, MI (US); Chengyin Yuan, Rochester Hills, MI (US); Stephan R. Biller, Birmingham, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 362 days.

(21) Appl. No.: 12/349,217

(22) Filed: Jan. 6, 2009

(65) Prior Publication Data
US 2010/0174395 A1    Jul. 8, 2010

(51) Int. Cl.
G06F 19/00      (2011.01)
G06F 11/26      (2006.01)
G06F 21/00      (2006.01)
G06F 17/50      (2006.01)
G06F 9/45       (2006.01)
G06G 7/62       (2006.01)
G01N 37/00      (2006.01)

(52) U.S. Cl. ............... 700/110; 714/25; 714/28; 703/13; 703/14; 703/22; 702/84

(58) Field of Classification Search ................ 700/110; 714/25, 28; 703/4, 13, 22; 702/84
See application file for complete search history.

(56) References Cited

U.S. PATENT DOCUMENTS

| | | | |
|---|---|---|---|
| 6,901,356 B1* | 5/2005 | Arita ................................ 703/7 |
| 7,408,336 B2* | 8/2008 | Birmiwal et al. ........... 324/76.22 |
| 2002/0062461 A1* | 5/2002 | Nee et al. ......................... 714/28 |
| 2008/0133031 A1* | 6/2008 | Newman et al. ................ 700/73 |
| 2008/0222453 A1* | 9/2008 | Bartz et al. ...................... 714/28 |
| 2009/0088884 A1* | 4/2009 | Yuan et al. .................... 700/110 |
| 2009/0088885 A1* | 4/2009 | Yuan et al. .................... 700/110 |
| 2009/0089700 A1* | 4/2009 | Gu et al. ........................ 715/771 |
| 2009/0106604 A1* | 4/2009 | Lange et al. .................... 714/45 |

* cited by examiner

*Primary Examiner* — Albert Decady
*Assistant Examiner* — Sivalingam Sivanesan
(74) *Attorney, Agent, or Firm* — Quinn Law Group, PLLC

(57) ABSTRACT

A method of testing a physical manufacturing automation system for manufactured work pieces is provided via a testing system and includes connecting a computer-simulated manufacturing automation system to a controller of the physical manufacturing automation system, wherein the computer-simulated manufacturing automation system is configured to represent a portion of the physical manufacturing automation system, including a simulated work piece. The method then includes concurrently running the physical manufacturing automation system and the computer-simulated manufacturing automation system via the controller, with the physical automation system running in the absence of the physical work pieces.

13 Claims, 4 Drawing Sheets

INTEGRATED TESTING SYSTEM AND METHOD FOR VALIDATION OF A MANUFACTURING AUTOMATION SYSTEM

TECHNICAL FIELD

The invention relates to a validation testing system and method for a manufacturing automation system field testing.

BACKGROUND OF THE INVENTION

Automation systems are widely used in manufacturing processes for productivity improvement. A typical automation system consists of a programmable logic controller (PLC), sensors and actuators, input/output (I/O) related connections either via fieldbus or direct wiring, and control logic which runs on the controller. Based on the state of sensor input, a controller commands the system (the actuators) to perform specific actions as designed by an engineer and prescribed in the control logic codes. As the control logic code is a type of software, initial bugs and errors are typical upon implementation, as is often the case with computer software. With advancement of computational technology, control logic can be tested and verified using math-based methods or an emulated system. However, the hardware and installation-related issues of the automation system cannot be tested using the math-based method or an emulated system alone. Therefore, field testing of the automation system is always required to verify that the system behaves as expected (i.e., as designed) by the engineer.

Traditionally, there are two types of field tests for validating a manufacturing automation system. These field tests may be often referred as "dry run" mode and "trial run" mode. In a "dry run" field test mode, the works-in-process (WIPs) are not present. The WIPs are also referred to herein as the work pieces, and are the physical entities that are manufactured or processed by the manufacturing automation system. For example, an automated vehicle assembly line undergoes a dry run field test mode without any vehicle components. In order to dry run a manufacturing automation system, any portion of the control logic that involves an input check of sensors that sense the presence and absence of the WIP has to be bypassed so that the automation system will run properly according to the control logic, as there is no physical WIP present. To disable the sensor input checking, special care needs to be taken during the control logic programming stage. A special "dry run" mode may be inserted into the control logic, or the sensor input could be manually provided through a specially programmed human-machine interface (HMI). The addition of the specific "dry-run" mode into the control logic increases the complexity of the code as well as increases engineering time. Furthermore, the main drawback of this type of "dry run" practice is that it may miss any potential faults in the control logic which depend on the validity of sensor input checking. Although the missed faults in the control logic can be discovered during the real "trial run" with physical components present and sensor input enabled, this may delay the launch of regular production using the automated system.

SUMMARY OF THE INVENTION

A method of testing a physical manufacturing automation system for manufactured components is provided. The method enables the complete, real-time testing of the manufacturing automation system in the absence of the manufactured or processed components, i.e., in the absence of the work-in-process "WIPs". By eliminating the dependency of the system testing on the availability of the part to be processed, validation of the manufacturing automation system can be conducted in parallel with other necessary pre-production testing, such as throughput analysis, without waiting for a prototype manufactured component to carry out the validation testing.

Specifically, a method of testing a physical manufacturing automation system for manufactured work pieces integrates a "virtual" (i.e., computer simulated) automation system with a "real" (i.e., physical) automation system. The method includes connecting a computer-simulated manufacturing automation system configured to represent a portion of the physical manufacturing automation system to a controller of the physical manufacturing automation system, and then concurrently running the physical manufacturing automation system and the computer-simulated manufacturing automation system via the controller, with the physical automation system running in the absence of any work pieces. Sensor signals from the computer-simulated manufacturing automation system, triggered by the computer-simulated work piece, are provided to the controller, and the controller generates automation signals to actuate both the physical manufacturing automation system and the simulated manufacturing automation system based at least in part on these sensor signals. All sensor signals that are related to or triggered by the work piece are provided by the simulated manufacturing automation system (i.e., are triggered by the simulated work piece). The sensor signals related to other system components, such as, for example, clamps, may be provided by the simulated manufacturing automation system, or, some or all of such sensor signals may be provided by the physical manufacturing automation system. If the physical manufacturing automation system fails to run according to a predetermined manner, deficiencies in the physical manufacturing automation system can be diagnosed and the physical manufacturing automation system then modified to address the deficiencies.

A testing system that carries out the above-described method includes a physical manufacturing automation system having actuators, some of which are configured to act on or cause action on the work pieces, and having sensors, some of which are configured to detect the presence or absence of the work pieces. A computer-simulated manufacturing automation system is configured to simulate the physical manufacturing automation system and has simulated actuators and simulated sensors operable to simulate the action on of the physical actuators and sensing of the physical sensors with respect to simulated work pieces. A programmable logic controller of the physical manufacturing automation system is operatively connected to both the physical actuators and some of physical sensors of the physical manufacturing automation system and to the simulated actuators and sensors of the computer-simulated manufacturing automation system, and is configured to run (i.e., actuate) the physical manufacturing automation system and the computer-simulated manufacturing automation system simultaneously, with the physical manufacturing automation system running in the absence of physical work pieces, by providing actuator signals to actuate both the physical actuators and the simulated actuators and responding to sensor signals from the simulated sensors. A PC input/output interface module may be used to connect the emulated manufacturing automation system with the controller at input/output signal level directly or indirectly via a field bus I/O module.

The above features and advantages and other features and advantages of the present invention are readily apparent from the following detailed description of the best modes for carrying out the invention when taken in connection with the accompanying drawings.

DESCRIPTION OF THE PREFERRED EMBODIMENTS

Figure 1:
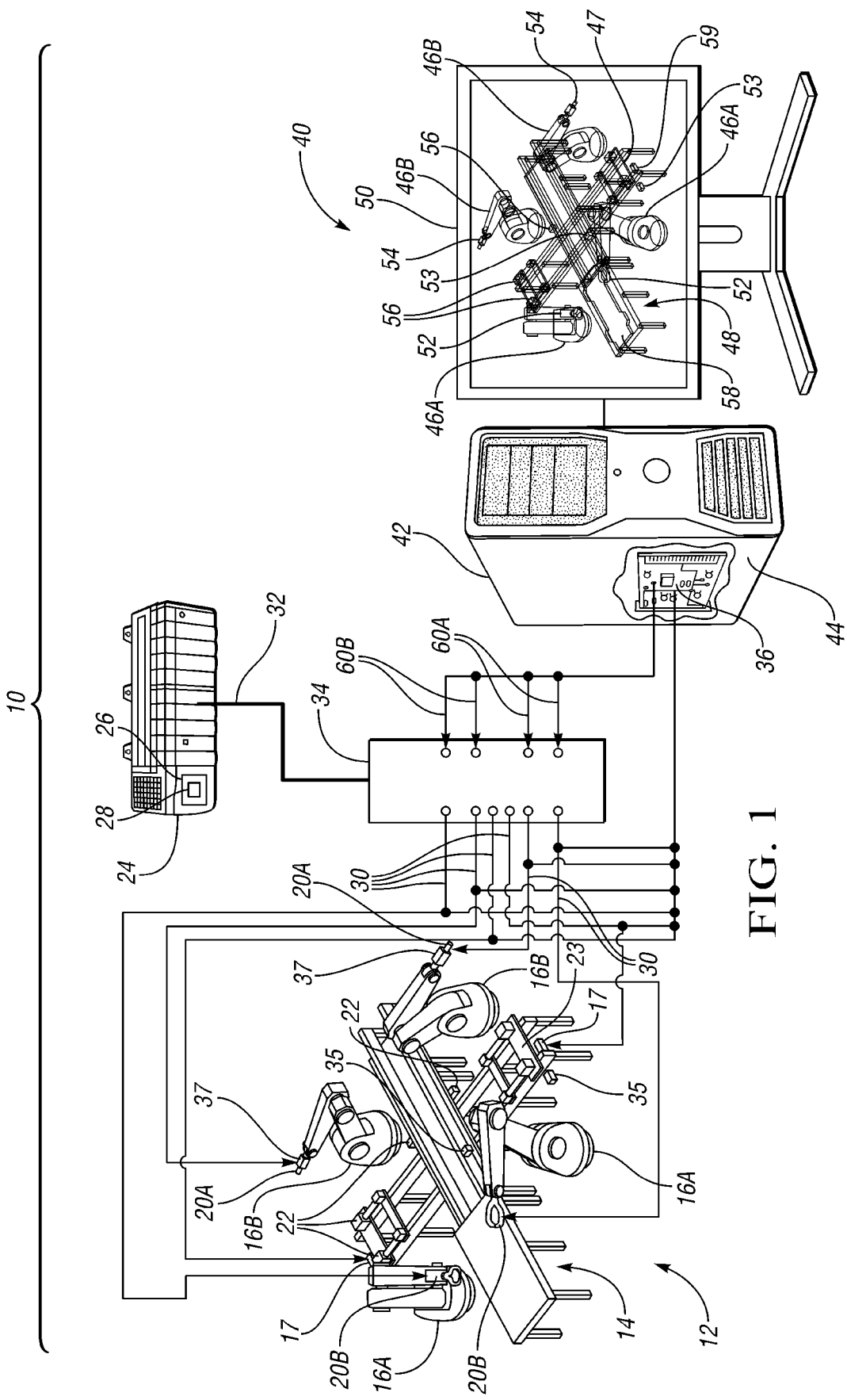
FIG. 1 is a schematic perspective view of a validation system for a physical manufacturing automation system.
Figure 4:
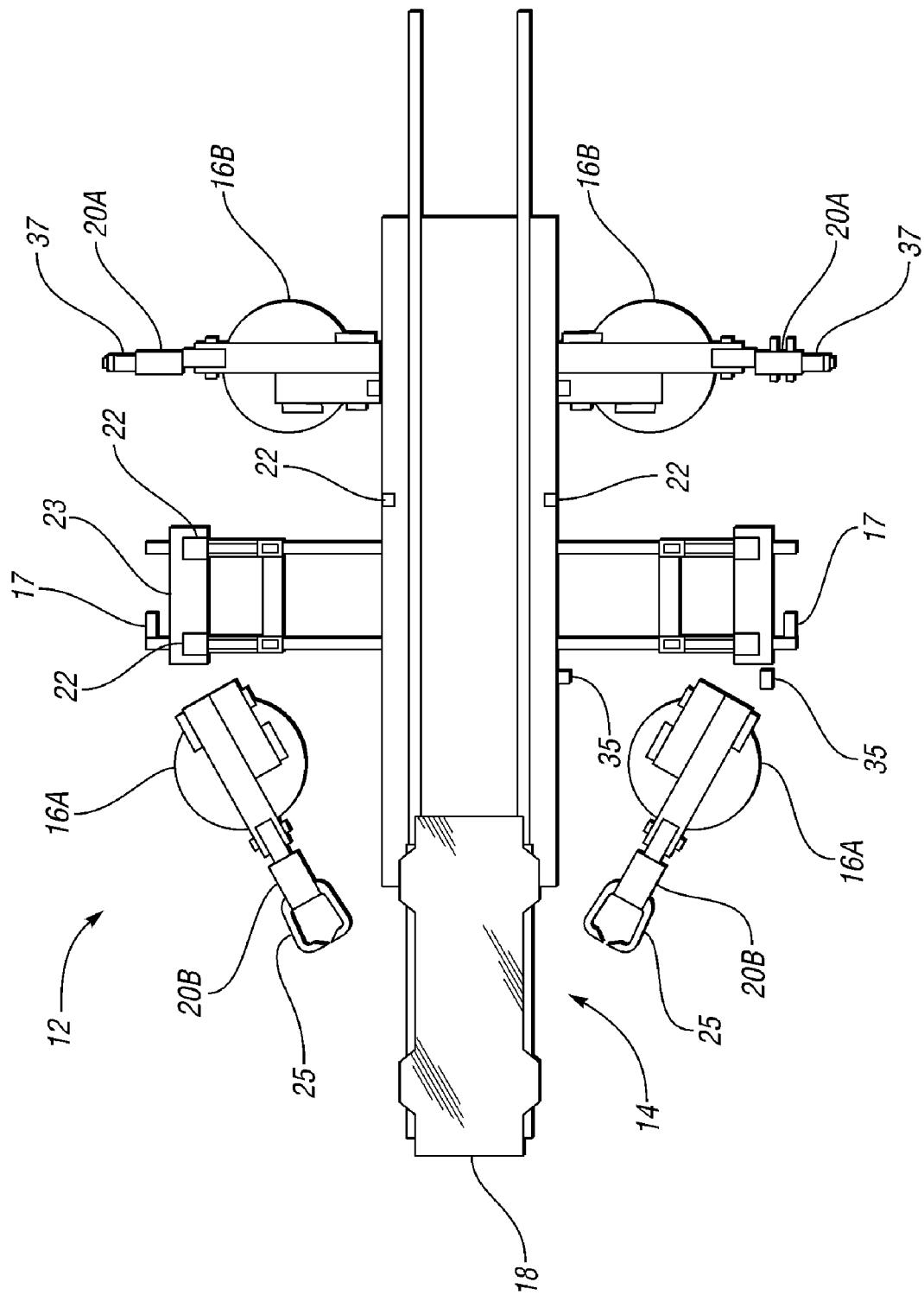
FIG. 4 is a schematic top view illustration of the physical manufacturing automation system of FIGS. 1-2.

Referring to the drawings, wherein like reference numbers refer to like components, FIG. 1 shows a validation testing system 10 for a physical manufacturing automation system (PMAS) 12. The PMAS 12 includes manufacturing apparatuses such as a conveyor system 14 and one or more automated robots, such as weld robots 16A and material handling robots 16B, which may also be adaptable for welding, as discussed below. The conveyor system 14 and the robots 16A, 16B are controllable to act on manufactured work pieces, also referred to herein as works-in-progress (WIPs) 18, to manufacture the WIPs 18, by assembling, forming, packaging, or otherwise acting on the WIPs 18. The WIPs are shown only on the conveyor system 14 in FIG. 4, for reasons described below. In FIG. 4, the WIP 18 is illustrated as an automotive underbody frame, with the PMAS 12 being an automotive underbody welding cell. The method of testing the validity of a PMAS is equally applicable to other types of PMAS systems as well. The robots 16B include actuators 20A actuatable to grip additional frame components to be welded to the WIPs 18, and place the additional components on the fixture 23. The fixtures 23 are actuatable to move toward and clamp the WIP 18 in a desired position on the conveyor system 14 so that the robots 16A can weld the additional frame components to the WIP 18. The robots 16A include other actuators 20B that are actuatable to act on the WIPs 18. In the exemplary validity system 10, the actuators 20B actuate weld guns. The robots 16B may be capable of switching from grippers 37 to weld tips, similar to weld tips 25 (shown in FIG. 4) on robots 16A, to also perform welding.

The PMAS 12 also includes sensors 22 that sense the presence of the WIPs 18, movement of WIPs, or movement of pallets with the WIPs thereon on the conveyor system 14. Additional sensors that sense actions or other characteristics of the PMAS 12 may also be included to ensure proper processing of the WIPs 18. For example, there may be certain sensors in the PMAS with a function not dependent on the presence or absence of a WIP, such as fixture position sensors 35 that indicate whether the fixture 23 is in the open position (shown in FIG. 4) or the closed position, moved inward toward the conveyor system 14 by actuators 17 in order to hold the WIP 18 during the manufacturing process.

The PMAS 12 includes a programmable logic controller 24 that includes a processor 26 on which a control code 28 is stored. The control code 28 is written to control manufacturing of the WIPs 18 by providing automation or actuation signals 30 to the actuators 17, 20A, 20B of the PMAS 12. The actuators 17, 20A, 20B and sensors 35 of the PMAS 12 are connected to the PLC 24 through a field bus 32 and a bus input/output module 34. The field bus 32 allows the various electrical connections between the PLC 24 and the actuators 17, 20A, 20B and sensors 22, 35 to be consolidated through the bus 32, reducing the length and number of wire connections coming into the PLC 24, as is understood by those skilled in the art. Alternatively, direct wire connections of the actuators 17, 20A, 20B and sensors 22, 35 of the PMAS 12 and the SMAS 40 to the PLC 24 may be used. The actuation signals 30 flow to the bus input/output module 34, which connects to the actuators 17, 20A, 20B and sensors 35 of the PMAS 12. The bus input/output module 34 also allows the possibility of providing the appropriate actuation signals via a specially preprogrammed menu of a human-man-interface (HMI) device connected to the PLC 24.

Because the proper motion sequence of the robots 16A, 16B, the fixture 23, and the conveyor system 14 is integral to the processing of the WIPs 18, validation testing of the PMAS 12, before either the WIPs 18 or prototypes thereof are available, may be necessary in the interest of reducing production launch time. Thus, the validation testing system 10 is designed to allow testing of the PMAS 12 in the absence of any physical WIPs 18. Accordingly, the physical WIPs 18 are not present on the conveyor system 14 of FIG. 1 during the validity testing described herein, but are shown for exemplary purposes in the top view of the PMAS 12 of FIG. 4. Because the sensors 22 will not be able to provide proper sensor signals to the PLC 24 if there are no physical WIPs 18 to be sensed during the validity testing, a virtual, i.e., computer-simulated, manufacturing automation system (SMAS) 40 is interconnected to the PLC 24 to provide at least the WIP-related sensor signals 60A on which automation of the PMAS 12 via the source code 28 is partly dependent. This avoids the alternative known method of testing via a "dry run" by modifying the control code 28 to bypass portions of the control code 28 that require such sensor signal input. Sensor signals 60A equivalent to those that would be provided by the PMAS 12, if it were run with the physical WIPs 18 present, are available from the SMAS 40. Accordingly, the validity test utilizes the complete control code 28 and is thus more accurate. By deriving the expected sensor signals of the PMAS 12 from the SMAS 40, potential faultiness of (i) the control code 28 that is dependent on the sensor signals of the PMAS 12, (ii) miswired or incorrectly configured portions of the PMAS 12, and (ii) deviation in placement of the sensors 22 from the design location, can be determined, avoiding waiting for a prototype or actual manufactured WIP 18 in order to discover any flaws relating to the sensors 22.

Figure 2:
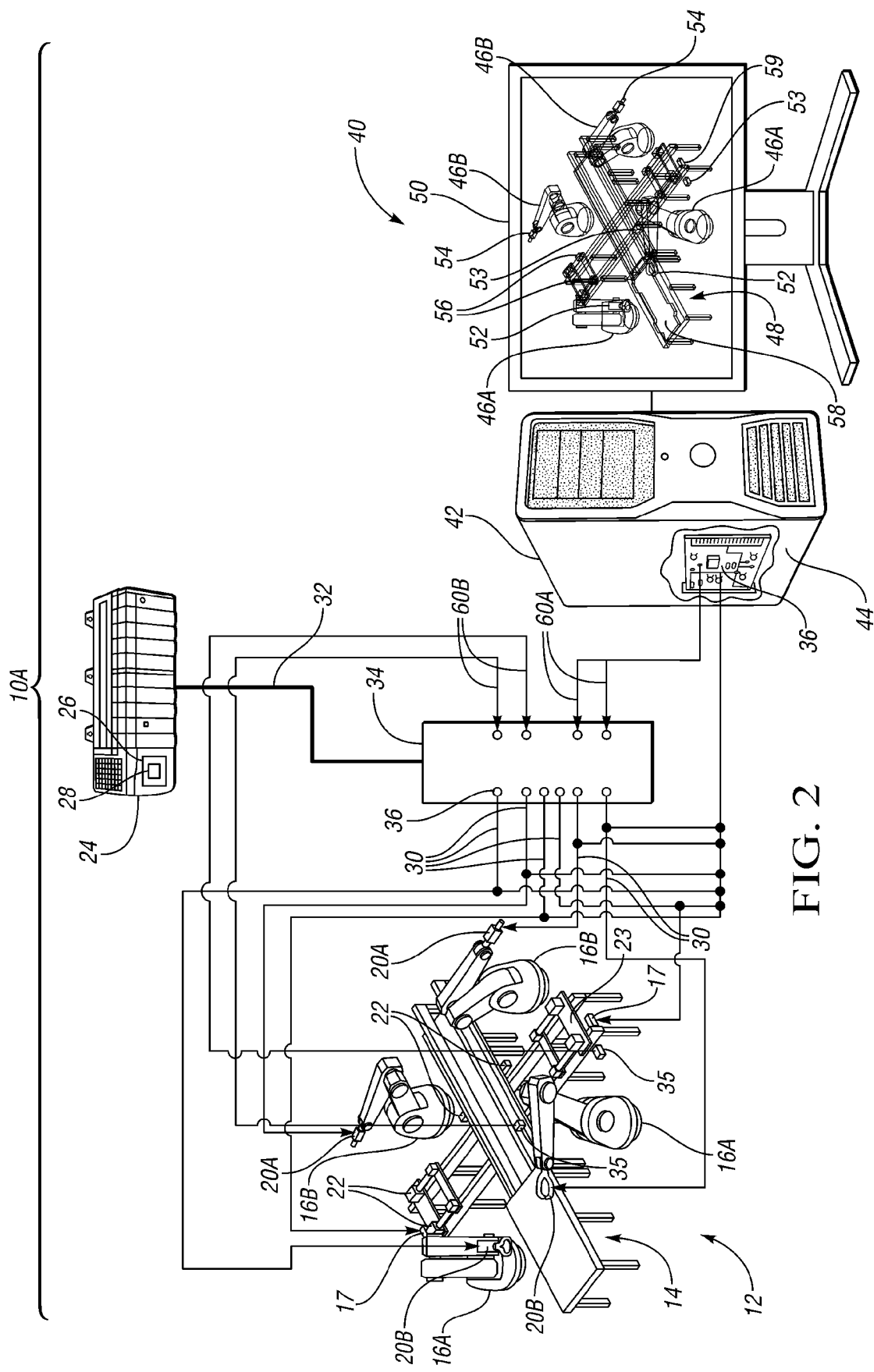
FIG. 2 is a schematic perspective view of an alternative embodiment of a validation system for a physical manufacturing automation system.

Accordingly, sensor signals 60B from sensors not dependent on the presence or absence of a WIP 18 (e.g., sensors 35) may be provided by either the SMAS 40, as set forth in FIG. 1 wherein all sensor signals 60A, 60B are provided by the SMAS 40, or may be provided by the PMAS 12, as indicated with reference number 60B in the alternative embodiment of a test system 10A of FIG. 2. All other components of the validation testing system 10A function identically to corresponding components of the validation testing system 10 of FIG. 1, and are referenced with like reference numbers.

The SMAS 40 includes a virtual assembly model that is a visually, physically, and kinematically accurate computer simulation of the fixture 23, conveyor system 14, robots 16A, 16B, WIPs 18, actuators 17, 20A, 20B and sensors 22, 25 of the PMAS 12, or the entire PMAS 12 excluding the PLC 24, bus input/output module 34 and I/O related connections. The virtual assembly model of the SMAS 40 includes a virtual replica of these components of the PMAS 12 built with commercially available specialty 3D emulation software. Communication of the SMAS 40 to these external physical devices of the PMAS 12 may be through a PC I/O interface card 36 inside of a computer 42, both of which are included in the SMAS 40, with the computer 42 running the simulated model of the SMAS 40, or through other physical communication means such as an Ethernet or field bus interface inside the computer 42. The I/O interface card 36 serves as a bridge between the simulated model of the SMAS 40 and physical devices of the PMAS 12 and provides the necessary signal level conversion between the computer 42 and the physical devices of the PMAS 12.

The SMAS 40 also includes the computer 42 with a processor 44 that includes code for computer-simulated robots 46A, 46B, the PC I/O interface card 36, a computer-simulated fixture 47, and a computer-simulated conveyor system 48, all of which are displayed on a computer display screen 50. The simulated robots 46A, 46B are developed based on the dimensions of the physical robots 16A, 16B, respectively, including one or more actuators 52 positioned in relation to the robots 46A identically to the relative positions of the actuators 20B to the physical robots 16A, and one or more actuators 54 positioned in relation to robots 46B identically to the relative positions of the actuators 20A to physical robots 16B. The simulated fixture 47 is stored as an emulated model representative of the fixture 23 and includes actuators 59 and sensors 53. Similarly, an emulated model for the simulated conveyor system 48 is generated by the processor 44 to represent the dimensions of the physical conveyor system 14. SMAS 40 includes emulated models for actuators 59 and sensors 53, 56, positioned in relation to the simulated conveyor system 48 identically as the actuators 17 and sensors 35, 22 are positioned relative to the physical conveyor system 14, respectively for performing respective equivalent functions. The SMAS 40 has an emulated model for simulated WIPs 58, which are dimensionally accurate representations of the WIPs 18. Code loaded in the processor 44 simulates the WIPs 58 being processed on the simulated conveyor system 48 and acted on by the actuators 52, 54, 59 according to the execution of the control code, partially in response to the same automation signals 30 that are also sent to the physical conveyor system 14. Sensor signals 60A are generated by the model based on simulated sensors 56 interacting with the simulated WIPs 58. Thus, the component presence-sensing of the PMAS 12 is superseded by the SMAS 40, with its simulated manufactured WIP 58 and simulated sensors 56. As stated above, the sensor signals provided by the SMAS 40 may be only those equivalent to those generated by the component related (i.e., WIP-related) sensors 22 of the PMAS 12 (e.g., signals 60A in FIG. 2), or may also include equivalent signals for some or all of the sensor signals provided by non-WIP-related sensors 35 (e.g., both signals 60A and 60B in FIG. 1). Any non-WIP-related sensor signals not provided by the SMAS 40 are provided by the PMAS 12 (e.g., signals 60B of FIG. 1).

Figure 3:
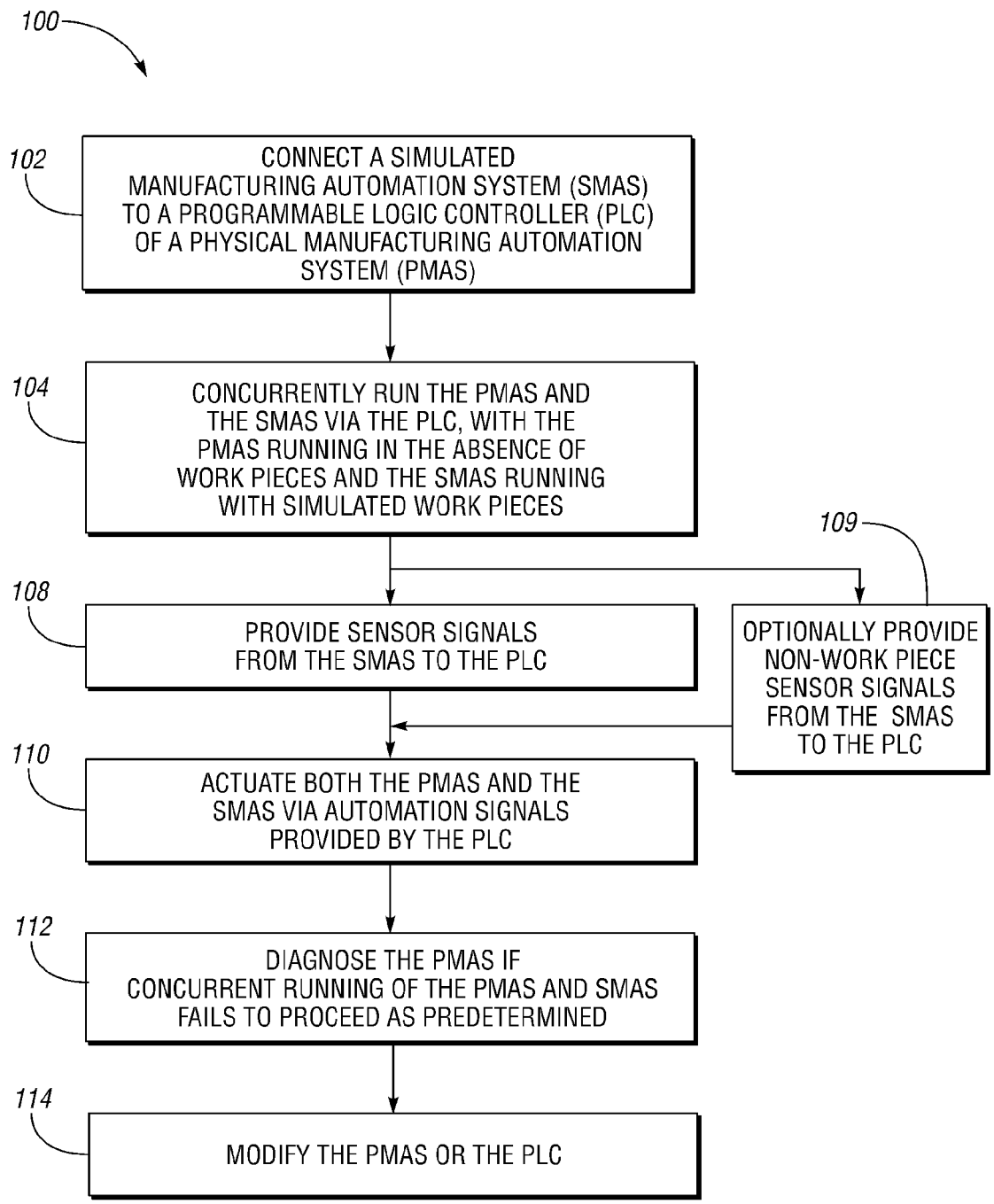
FIG. 3 is a flow chart illustrating a method of validating the physical manufacturing automation systems of FIGS. 1 and 2.

Referring to FIG. 3, a flowchart is shown that represents a method 100 of testing a manufacturing automation system and is described herein with respect to the test system 10 of FIG. 1, but applies equally to the test system 10A of FIG. 2. First, in block 102, the method 100 includes connecting the SMAS 40 to the PLC 24 of the PMAS 12. As described above, this interface may include the field bus 32 and the bus input/output module 34 or a direct connection. Some or all of the physical sensor inputs of the PMAS 12 may first need to be disconnected from the field bus 32 and bus input/output module 34. Sensor inputs for the SMAS 40 to the bus input/output module 34 are connected with corresponding output ports of the PC I/O card 36. Actuator outputs of the bus input/output module 34 are connected with input ports of the PC I/O card 36 of the SMAS 40 and are spliced with the existing connections to the physical actuators 20A, 20B, 17. The input and output ports of the I/O card 36 must be configured or mapped with the corresponding simulated sensors and actuators of the SMAS 40. Next, in block 104, the conveyor system 14, fixture 23, robots 16A, 16B, actuators 17, 20A, 20B and sensors 22, 35 of the PMAS 12 and the corresponding modeled components of the SMAS 40 are concurrently run via the PLC 24, with the components of the PMAS 12 running in the absence of any manufactured WIPs 18 (i.e., run without processing any WIPs 18). In block 108, sensor signals 60A are provided from the SMAS 40 to the PLC 24. Sensor signals not dependent on the presence of absence of the WIPs 18 (e.g., sensor signals 60B) may be provided by the SMAS 40 in block 108, or, under block 109, sensor signals 60B may be provided by the sensors 35 of the PMAS 12, as in the test system 10A of FIG. 2. Based at least in part on the sensor signals 60A, 60B that are provided, the PLC 24 generates automation signals 30 that are provided to both the actuators 17, 20A, 20B of the PMAS 12 and the actuators 52, 54, 59 of the SMAS 40 in block 110 to actuate the actuators 17, 20A, 20B of the PMAS 12 and the actuators 52, 54, 59 of the SMAS 40.

If at any time during the validation testing, running of the PMAS 12 or the SMAS 40 fails to proceed according to the predetermined automation of the systems, the PMAS 12 will be diagnosed for logic or other errors in block 112, and will be modified in block 114 to correct the errors. Accordingly, validation testing of the PMAS 12 is accomplished in the absence of any WIPs 18.

While the best modes for carrying out the invention have been described in detail, those familiar with the art to which this invention relates will recognize various alternative designs and embodiments for practicing the invention within the scope of the appended claims.

The invention claimed is:

1. A method of for validation of a physical manufacturing automation system for manufactured work pieces, comprising:
   connecting a computer-simulated manufacturing automation system configured to represent a portion of the physical manufacturing automation system, and including simulated work pieces, to a controller of the physical manufacturing automation system;
   concurrently running the physical manufacturing automation system and the computer-simulated manufacturing automation system via the controller, the physical automation system running in the absence of any work pieces; and
   providing sensor signals from the computer-simulated manufacturing automation system to the controller, the controller generating automation signals to actuate both the physical manufacturing automation system and the computer-simulated manufacturing automation system based at least in part on the sensor signals.

2. The method of claim 1, wherein the sensor signals provided by the computer-simulated manufacturing automation system are only from simulated sensors whose signaling function is dependent on either the presence or absence of the simulated work pieces.

3. The method of claim 1, wherein the sensor signals provided by the computer-simulated manufacturing automation system are both from simulated sensors whose function is not dependent on either the presence or absence of the simulated work pieces and from other simulated sensors whose signaling function is affected by the presence or absence of the simulated work pieces.

4. The method of claim 1, further comprising:
diagnosing a deficiency of the physical manufacturing automation system if said concurrently running fails to proceed according to a predetermined manner.

5. The method of claim 4, further comprising:
modifying the physical manufacturing automation system and the simulated manufacturing automation system or a control code stored in the controller based on the diagnosing.

6. A method for validation of a physical manufacturing automation system, comprising:
connecting a computer-simulated manufacturing automation system to a controller of the physical manufacturing automation system having a control code; wherein the computer-simulated manufacturing automation system is configured to simulate a portion of the physical manufacturing automation system and a work piece processed thereon, and includes simulated actuators and simulated sensors configured to simulate physical actuators and physical sensors, respectively, of the physical manufacturing automation system;
wherein at least some of the physical actuators are configured to actuate in response to an actuation signal from the controller to act on the work piece and at least some of the simulated actuators simulate actuation to act on the simulated work piece in response to a substantially identical electronic actuation signal provided by the controller;
wherein at least some of the physical sensors are configured to provide electronic sensor signals to the controller in response to sensing the presence or absence of the work piece; and wherein at least some of the simulated sensors provide equivalent electronic sensor signals to the controller in response to simulated sensing of the simulated work piece; wherein the electronic sensor signals are used by the control code to generate the electronic actuation signals; and
concurrently running actuators of the physical manufacturing automation system and the computer-simulated manufacturing automation system via the control code; wherein the physical manufacturing automation system is run in the absence of the work piece, the control code thereby responding to the electronic sensor signals provided by the simulated sensors and actuating both the physical manufacturing automation system and the computer-simulated manufacturing automation system based at least partly on the electronic sensor signals of the simulated sensors.

7. The method of claim 6, wherein at least some of the electronic sensor signals provided by the simulated sensors are related to the presence or absence of the simulated work piece; and wherein other electronic sensor signals provided by the sensors in the physical manufacturing automation system are not related to the presence or absence of the work piece.

8. The method of claim 6, further comprising:
diagnosing a deficiency of the physical manufacturing automation system if said running fails to proceed according to a predetermined manner.

9. The method of claim 8, further comprising:
modifying the physical manufacturing automation system and the simulated manufacturing automation system or the control code based on the diagnosing.

10. A testing system comprising:
a physical manufacturing automation system having at least some actuators configured to cause action on a work piece and at least some sensors configured to sense the presence or absence of the work piece;
a computer-simulated manufacturing automation system configured to simulate a portion of the physical manufacturing automation system and having simulated actuators and simulated sensors operable to simulate the action on and sensing of the physical actuators and physical sensors with respect to a simulated work piece; and
wherein the physical manufacturing automation system includes a programmable logic controller operatively connected to both the actuators and the sensors of the physical manufacturing automation system and the computer-simulated manufacturing automation system and configured to run the actuators of the physical manufacturing automation system and the computer-simulated manufacturing automation system simultaneously by providing actuator signals to actuate both the actuators of the physical manufacturing automation system and the simulated actuators and by responding to sensor signals from the simulated sensors, with the physical manufacturing automation system running in the absence of the work piece.

11. The testing system of claim 10, wherein the physical manufacturing automation system includes a field bus operatively connecting the programmable logic controller both to the actuators and the sensors of the physical manufacturing automation system physical and to the computer-simulated manufacturing automation system.

12. The testing system of claim 10, wherein the physical manufacturing automation system includes an input/output module operatively connecting the actuators and the sensors of the physical manufacturing automation system with the programmable logic controller.

13. The testing system of claim 10, wherein the physical manufacturing automation system includes a robot configured to act on the work piece; and wherein the computer-simulated manufacturing automation system includes a computer-simulated robot configured to simulate equivalent action on the simulated work piece.

* * * * *